United States Patent
Abadi et al.

(10) Patent No.: US 9,747,143 B1
(45) Date of Patent: Aug. 29, 2017

(54) MULTI PLATFORM BASED EVENT PROCESSING

(71) Applicant: International Business Machines Corporation, Armonk, NY (US)

(72) Inventors: Aharon Abadi, Petach Tikva (IL); Jonathan Bnayahu, Haifa (IL); Alexander Kofman, Haifa (IL); Mordechai Nisenson, Kiryat Tivon (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/084,495

(22) Filed: Mar. 30, 2016

(51) Int. Cl.
*G06F 3/00* (2006.01)
*G06F 9/44* (2006.01)
*G06F 9/46* (2006.01)
*G06F 13/00* (2006.01)
*G06F 9/54* (2006.01)

(52) U.S. Cl.
CPC .................. *G06F 9/542* (2013.01)

(58) Field of Classification Search
None
See application file for complete search history.

(56) References Cited

U.S. PATENT DOCUMENTS

| | | | | |
|---|---|---|---|---|
| 7,984,513 B1* | 7/2011 | Kyne | ................. | G06F 21/10 706/47 |
| 8,166,165 B1* | 4/2012 | Meketa | ................. | G06F 9/542 709/225 |
| 8,762,367 B2* | 6/2014 | Burger | ................. | G06F 17/30469 707/718 |
| 8,965,827 B2* | 2/2015 | Burris | ................. | G06N 5/025 706/47 |
| 9,420,002 B1* | 8/2016 | McGovern | ................. | H04L 63/20 |
| 2005/0027981 A1* | 2/2005 | Baum-Waidner | ... | H04L 63/1408 713/164 |
| 2006/0129821 A1* | 6/2006 | Zugenmaier | ................. | G06F 21/57 713/175 |
| 2014/0229839 A1* | 8/2014 | Lynch | ................. | G06F 9/44505 715/736 |
| 2015/0242253 A1* | 8/2015 | Isoyama | ................. | G06F 9/5027 719/318 |
| 2016/0162476 A1* | 6/2016 | Munro | ................. | G06F 17/241 704/9 |

* cited by examiner

*Primary Examiner* — Tuan Dao
*Assistant Examiner* — William C Wood
(74) *Attorney, Agent, or Firm* — Ziv Glazberg

(57) ABSTRACT

A method for executing an event processing application in a multi-platform environment which includes a first computing platform and a second computing platform. The event processing application comprises a network of a plurality of processing rules, each of which, when executed by a computing platform, is configured to process incoming events and output outgoing events. The method comprises automatically identifying one or more processing rules comprised by the event processing application that are restricted to be executed in the first computing platform. The automatic identification comprises analyzing each rule in the plurality of processing rules to determine whether the rule is configured to perform a restricted activity. The method further comprises executing the plurality of processing rules in the multi-platform environment, some of which are executed in the first computing platform and some are executed in the second computing platform.

18 Claims, 4 Drawing Sheets

MULTI PLATFORM BASED EVENT PROCESSING

TECHNICAL FIELD

The present disclosure relates to event processing in general, and to executing of event processing applications in multi-platform environments, in particular.

BACKGROUND

Event processing is a technique in which event data is processed to generate higher-level and more-useful events, deriving information from the event data, or the like. Event processing platforms may filter incoming data, store windows of event data, compute aggregates and detect patterns.

Complex event processing (CEP) is event processing that combines data from multiple sources to infer events or patterns that suggest more complicated circumstances. The goal of CEP is to identify meaningful events and respond to them as quickly as possible, such as finding their relationships, inferring new data from the event and the relationships, or the like. CEP employs techniques such as detection of complex patterns of many events, event correlation and abstraction, event hierarchies, and relationships between events such as causality, membership, and timing, and event-driven processes.

BRIEF SUMMARY

One exemplary embodiment of the disclosed subject matter is a computer-implemented method for executing an event processing application in a multi-platform environment, wherein the multi-platform environment comprising a first computing platform and a second computing platform, wherein the event processing application comprising a network of a plurality of processing rules, wherein each processing rule, when executed by a computing platform, is configured to process incoming events and output outgoing events; wherein said method comprising: automatically identifying one or more processing rules comprised by the event processing application that are restricted to be executed in the first computing platform, wherein said automatically identifying comprises: analyzing each rule in the plurality of processing rules to determine whether the rule is configured to perform a restricted activity; and executing the plurality of processing rules in the multi-platform environment, wherein the one or more processing rules are executed in the first computing platform, wherein at least one processing rule of the event processing application is executed in the second computing platform.

Another exemplary embodiment of the disclosed subject matter is a multi-platform system for executing an event processing application, wherein the multi-platform system comprising a first computing platform and a second computing platform, wherein the event processing application comprising a network of a plurality of processing rules, wherein each processing rule, when executed by a computing platform, is configured to process incoming events and output outgoing events; wherein said multi-platform system comprising one or more processors being adapted to perform: automatically identifying one or more processing rules comprised by the event processing application that are restricted to be executed in the first computing platform, wherein said automatically identifying comprises: analyzing each rule in the plurality of processing rules to determine whether the rule is configured to perform a restricted activity; and executing the plurality of processing rules, wherein the one or more processing rules are executed in the first computing platform, wherein at least one processing rule of the event processing application is executed in the second computing platform.

Yet another exemplary embodiment of the disclosed subject matter is a computer program product for executing an event processing application in a multi-platform environment, wherein the multi-platform environment comprising a first computing platform and a second computing platform, wherein the event processing application comprising a network of a plurality of processing rules, wherein each processing rule, when executed by a computing platform, is configured to process incoming events and output outgoing events, wherein said computer program product comprising a non-transitory computer readable storage medium retaining program instructions, which program instructions when read by a processor, cause the processor to perform a method comprising: automatically identifying one or more processing rules comprised by the event processing application that are restricted to be executed in the first computing platform, wherein said automatically identifying comprises: analyzing each rule in the plurality of processing rules to determine whether the rule is configured to perform a restricted activity; and executing the plurality of processing rules in the multi-platform environment, wherein the one or more processing rules are executed in the first computing platform, wherein at least one processing rule of the event processing application is executed in the second computing platform.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

Figure 1A:
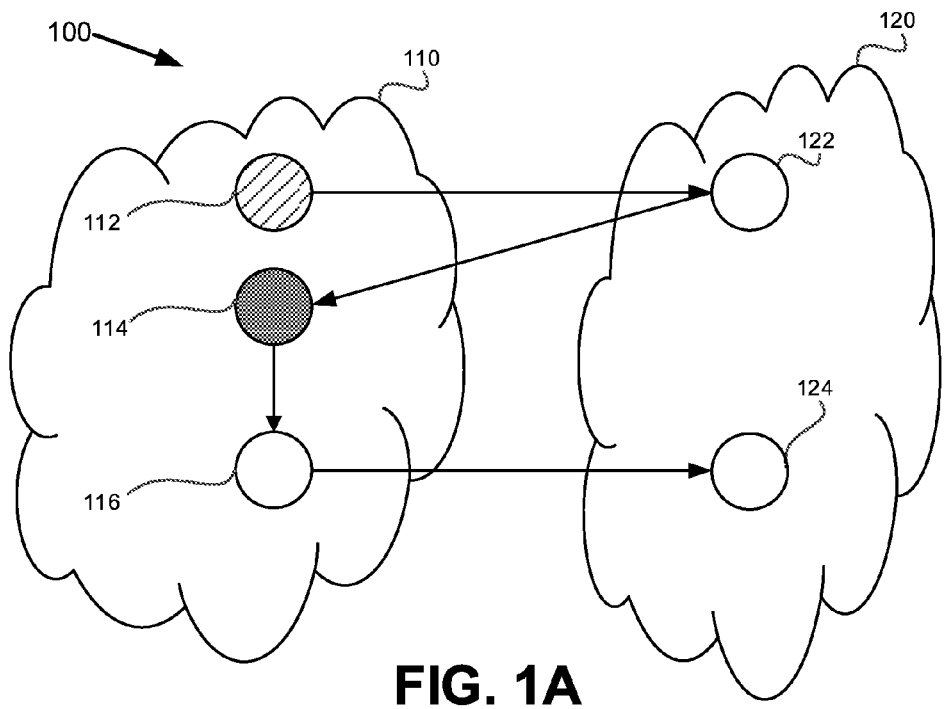
FIGS. 1A and 1B show schematic illustrations of an event processing applications being executed in a multi-platform environment, in accordance with some exemplary embodiments of the subject matter.

One technical problem dealt with by the disclosed subject matter is to execute Event Processing (EP) applications in a multi-platform environment. The multi-platform environment may be an environment that comprises multiple computing platforms that inter-operate in order to execute the EP application. In some exemplary embodiments, the multi-platform environment may comprise two or more computing platforms. The computing platforms may differ in any abstraction level that is useful to distinguish between them. As an example, the multi-platform environment may be environment comprising a private computing platform (e.g., a server located within a specific Local Area Network) and a public computing platform (e.g. a cloud-computing platform accessible over the Internet). In some cases, the EP may require processing private data that is restricted to the private computing platform and is restricted from being migrated or copied to the public computing platform. Additionally or alternatively, some rules applied by the EP may be themselves restricted rules, such as an algorithm protected by a trade secret, which the owner of the EP may not want to be dispatched over a public network.

In some exemplary embodiments, the multi-platform environment may comprise a plurality of different private computing platforms, such that some data is restricted to one platform and some data is restricted to another. In some exemplary embodiments, a public computing platform may also be part of the environment and may be used to compute non-restricted rules analyzing non-restricted data. In some exemplary embodiments, the public computing platform may comprise better computing resources, may be cheaper to utilize, or have other advantages over a private computing platform. As a result, it may be advisable to generally utilize the public computing platform more than the private platform.

In some exemplary embodiments, the event processing application may comprise a network of a plurality of processing rules. Each processing rule, when executed by a computing platform, may be configured to process incoming events and output outgoing events. In some exemplary embodiments, processing rules may be designed to depend on features of the computing platform, such as hardware features, operating system related features, properties of the computing platform, virtual machines the computing platform runs on, or the like. Additionally or alternatively, processing rules may be restricted to be executed in a specific computing platform, in view of confidential algorithms, accessing private data, or the like.

One technical solution is to execute the plurality of processing rules in the multi-platform environment, such that processing rules that are identified as restricted to be executed in the first computing system, are executed in the first computing system; and at least one processing rule of the event processing application is executed in the second computing platform.

In some exemplary embodiments, one or more processing rules comprised by the event processing application that are restricted to be executed in the first computing platform may be identified. In some exemplary embodiments, identification of the one or more processing rules may be performed by analyzing each rule in the plurality of processing rules to determine whether the rule is configured to perform a restricted activity.

In some exemplary embodiments, the restricted activity may be a retrieval or storage of a restricted data attribute, performing a computation process that is restricted, or the like. Data attributes and computations process that are restricted may be defined by a user indication. Additionally or alternatively, the restricted activity may comprise accessing confidential data that is only made available in a specific computing platform; performing a proprietary processing that is kept as a trade secret and is only made available in a specific computing platform, or the like.

As one example, the event processing application may comprise processing rules that are configured to perform unsafe computing activities, and accordingly have to be executed in a computing platform that comprises appropriate security techniques. As another example, the event processing application may comprise processing rules that retrieve data that is not suitable for children. Accordingly, only processing rules that comprise safe data retrieval activity may be allowed to be executed in a specific computing platform.

Another technical solution is to refactor processing rules comprising restricted activities into a chain of processing rules. Each rule of the chain of processing rule may be either a restricted rule or a non-restricted rule. In some cases, some restricted rules may be purely restricted rules that consisting of at least one restricted activity and that do not comprise any additional intermediate non-restricted activity. Non-restricted rules may be rules not comprising any restricted activity. Refactoring may comprise splitting a single rule into one or more rules, while maintaining equivalent logic. As an example, a non-purely restricted rule may be refactored into a set of purely restricted rules and a set of non-restricted rules. As another example, a restricted rule may be split into a restricted sub-rule, which may not be purely restricted, and a non-restricted sub-rule.

In some exemplary embodiments, a portion of non-restricted rules of the chain of processing rules may be executed in the first computing platform, while a remainder portion of the non-restricted rules may be executed in the second computing platform. In some exemplary embodiments, non-restricted rules may be executed in the first computing platform so as to avoid incurring overhead of transmitting data between the computing platforms. As a result, even though the resources of the second platform may allow faster execution of the non-restricted rule than the first computing platform, in view of the overhead, it may be preferable to execute the non-restricted rule on the first computing platform.

In some exemplary embodiments, an optimized execution plan of the event processing application may be generated. The optimized execution plan may minimize a cost function for executing the event processing application on the multi-platform environment. The cost function may be defined by incorporating the latency overhead for transferring information between different platforms of the multi-platform environment. In some exemplary embodiments, an execution cost of a processing rule by a specific computing platform may be smaller than an execution cost of the processing rule by another computing platform. In some exemplary embodiments, execution cost may be any performance related measurement, as well as economic cost of execution.

In some exemplary embodiments, only non-restricted rules may be allowed to be executed on different computing platforms. Restricted rules may be restricted to be executed in a first computing platform, while non-restricted rules may be planned to be executed according to the cost function. In some exemplary embodiments, the cost function may be defined by a user, a part of the multi-platform environment criteria, or the like.

In some exemplary embodiments, determining the optimized execution plan may be performed in a static manner prior to execution the plurality of processing rules. A static optimized execution plan may be determined based on the pre-defined cost function. As an example, the static optimized execution plan may be determined to minimize an overall execution time of the event processing rule in the multi-platform environment, given an expected communication latency between the different computing platforms. As another examples, the cost function may be based on expected economic cost of resource utilization, such as may be the case when CPU utilization is measured and billed according to a rate, which may be potentially different in different platforms (e.g. the rate in the public computing platform may be lower than the rate in the private computing platform). In some exemplary embodiments, successive processing rules that are determined to be executed in the same computing platform may be merged back to avoid creating intra-rule events, which may increase overhead and hinder performance.

Additionally or alternatively, the optimized execution plan may be determined dynamically while executing the plurality of processing rules. In some exemplary embodiments, available resources in each computing platform of the multi-platform environment may be monitored. The dynamic optimized execution plan may be performed based on the monitored available resources. The available resources may include, but are not limited to, available bandwidth, available processing power, available memory, or the like. In some exemplary embodiments, the dynamic optimized execution plan may be designed by monitoring an expected actual execution time of a processing rule in each computing environment, given up-to-date information regarding the monitored available resources. Dynamic determination of the execution plan may take into account dynamic costs which may change over time. As an example, a processing rule may be determined to be executed in the first computing platform during executing the plurality of processing rules, even if statically it may seem that executing the processing rule in the second computing platform is preferable. Such may be the case, if the second computing platform is overloaded with other computing tasks, if the first computing platform has unexpectedly high idle processing time, or the like.

In some exemplary embodiments, non-restricted rules may be duplicated, and made them available for execution in more than one computing platform. A copy of such a non-restricted rule may be determined to be executed in a specific computing platform based on the monitored available resources of the specific computing platform.

One technical effect of the disclosed subject matter is to execute event processing application in multi-platform environments while potentially minimizing the cost of the multi-platform execution. The disclosed subject matter may provide for an automatic manner of splitting the EP application into processes executed on different platforms without requiring specific human design, costly design phase and high maintenance costs. Additionally or alternatively, the disclosed subject matter automatically takes into account overhead related to communication involved in transferring data from one computing platform to the other. Embodiments of the disclosed subject matter may reduce the effort involved in establishing a privacy-maintaining deployment of the EP applications, without substantial performance deterioration.

Referring now to FIG. 1A showing a schematic illustration of an event processing application, in accordance with some exemplary embodiments of the subject matter.

In some exemplary embodiments, a Multi-Platform Environment 100 may comprise a First Computing Platform 110 and a Second Computing Platform 120. Computing process that are designed to be executed in Multi-Platform Environment 100 may be executed in First Computing Platform 110, in Second Computing Platform 120, partially in each of the above, or the like. In some exemplary embodiments, First Computing Platform 110 and Second Computing Platform 120 may have different facilities, different properties, different resources at their disposal, or the like.

In some exemplary embodiments, an event processing application may be executed in Multi-Platform Environment 100. The event processing application may comprise a network of a plurality of processing rules, such as Processing Rule 112, Processing Rule 114, Processing Rule 116, Processing Rule 122 and Processing Rule 124. Each processing rule, when executed by a computing platform, may be configured to process incoming events and output outgoing events. In some exemplary embodiments, an outgoing event of a processing rule may be an incoming event of a following processing rule in the network. As an example, an outgoing event of Processing Rule 112 may be an incoming event of Processing Rule 122, and an outgoing event of Processing Rule 122 may be an incoming event of Processing Rule 114. In some exemplary embodiments, a processing rule may receive a plurality of incoming events from one or more sources such as processing rules, sensors, or the like. Additionally or alternatively, a processing rule may output a plurality of outgoing events that may be provided to one or more other processing rules.

In some exemplary embodiments, Processing Rule 112, Processing Rule 114 and Processing Rule 116 may be restricted to be executed in First Computing Platform 110. Processing Rule 112, Processing Rule 114 and Processing Rule 116 may be configured to perform a restricted activity. The restricted activity may be restricted to be performed in First Computing Environment 110. Other activities performed by the processing rules may be performed either in First Computing Environment 110 or in Second Computing Environment 120.

In some exemplary embodiments, the restricted activity may be a retrieval or storage of a restricted data attribute. Such a data attribute may be indicated as restricted by a user, and may be confined to be stored in First Computing Environment 110. Additionally or alternatively, the restricted activity may comprise accessing confidential data that is only made available in First Computing Platform 110 and not in Second Computing Platform 120. As another examples, the restricted activity may be performing a computation process that is restricted, performing a proprietary processing that is kept as a trade secret and may only be available in First Computing Platform 110. Additionally or alternatively, the restricted activity may be activating a hardware or software component that is only available in First Computing Platform 110, such as a prototype processor, a proprietary cryptographic device, or the like.

In some exemplary embodiments, First Computing Platform 110 may be a private computing platform, while Second Computing Platform 120 may be a public computing platform. The private computing platform may retain private data, such as confidential data, private customer data, medical profiles, or the like. The private data or the restricted activity performed by First Computing Platform 110 may not be exposed to Second Computing Platform 120, users connected to Second Computing Platform 120, or the like. Additionally or alternatively, Second Computing Platform 120 may have several benefits over First Computing Platform 110, such as higher bandwidth, more processing power, shorter execution time of process, lower cost maintenance, wider sharing options, or the like.

In some exemplary embodiments, Multi-Platform Environment 100 may comprise a third computing platform (not shown). A second restricted activity may be restricted to be executed only on the third computing platform.

In some exemplary embodiments, processing rules comprised by the event processing rule may be executed in Multi-Platform Environment 100. Processing Rule 112, Processing Rule 114 and Processing Rule 116 may be executed in First Computing Platform 110 while Processing Rule 122 and Processing Rule 124 may be executed in Second Computing Platform 120. In some exemplary embodiments, an execution plan may be determined automatically so as to meet the restrictions on the execution of the processing rules.

Figure 1B:
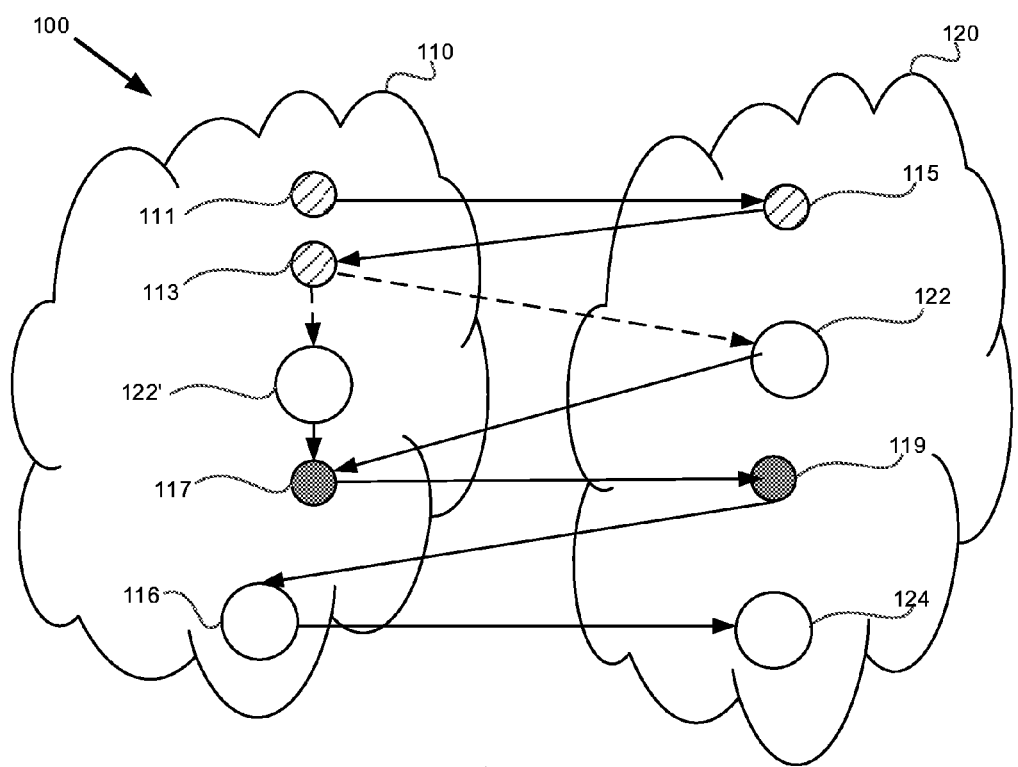

Referring now to FIG. 1B showing a schematic illustration of an event processing application, in accordance with some exemplary embodiments of the subject matter.

In some exemplary embodiments, Processing Rule 112 shown in FIG. 1A may be refactored into a chain of processing rules. The chain of processing rules, also referred to as sub-rules, may comprise Processing Rule 111, Processing Rule 113 and Processing Rule 115. In some exemplary embodiments, processing rules may be refactored into groups of purely restricted rules and non-restricted rules. In some cases, a restricted rule may be refactored to comprise also a sub-rule that in itself is a restricted rule that is not purely restricted.

In some exemplary embodiments, instead of executing Processing Rule 114 on First Computing Platform 110, such rule is divided into sub-rules and at least some of which can be executed on Second Computing Platform 120, potentially reducing execution time of Processing Rule 114.

In some exemplary embodiments, the refactoring may also create intra-rule events, such as an event issued by Processing Rule 111 and received by Processing Rule 115 and such as an event issued by Processing Rule 115 and received by Processing Rule 113. Such intra-rule events, that may be conceptually internal to the refactored rule, Processing Rule 112, may be useful for enforcing an order of execution between the sub-rules (which may be a full or partial order) and for passing information between one sub-rule to the other. In some exemplary embodiments, in case consecutive pure rules are executed on the same platform they may be merged together to avoid the overhead associated with having an intra-rule event issued by one rule and received and analyzed by another.

Processing Rule 114 shown in FIG. 1A may be refactored into Processing Rule 117 and Processing Rule 119, thereby allowing a portion of the rule to be performed on Second Computing Platform 120.

Processing Rule 111, Processing Rule 113, Processing Rule 117 and Processing Rule 116 may comprise each a restricted activity and be either purely restricted or non-purely restricted. Processing Rule 111, Processing Rule 113, Processing Rule 117 and Processing Rule 116 may be executed in First Computing Platform 110.

Processing Rule 115, Processing Rule 122, Processing Rule 119 and s Processing Rule 124 may be non-restricted rules. In some exemplary embodiments, a portion of the non-restricted rules may be executed by First Computing Platform 110, and a remainder portion of such non-restricted rules may be executed in Second Computing Platform 120.

In some exemplary embodiments, the determination to execute non-restricted rules in a restricted platform (e.g., 110) may be a static decision that is made a-priori. Additionally or alternatively, the decision may be dynamic so that in some cases the rule is executed by the restricted platform and in other cases it is executed by the non-restricted platform (e.g., 120). In some exemplary embodiments, Processing Rule 122, which is a non-restricted rule, may be duplicated and available for execution in First Computing Platform 110 as Processing Rule 122' and in Second Computing Platform 120 as Processing Rule 122. In some exemplary embodiments, a cost function for executing the event processing application on Multi-Platform Environment 100 may be defined. The cost function may calculate latency overhead for transferring information between First Computing Platform 110 and Second Computing Platform 120 as well as execution time by each platform in view of its specific properties and resources. An optimized execution plan of the event processing application may be determined by minimizing the cost function. The processing rules may be executed based on the optimized execution plan.

In some exemplary embodiments, the optimized execution plan may be performed in a static manner prior to executing the processing rules. Additionally or alternatively, available resources in First Computing Platform 110 and in Second Computing Platform 120 may be monitored to determine the optimized execution plan dynamically while executing the processing rules. A dynamic execution plan may be determined based on the monitored available resources.

Figure 2A:
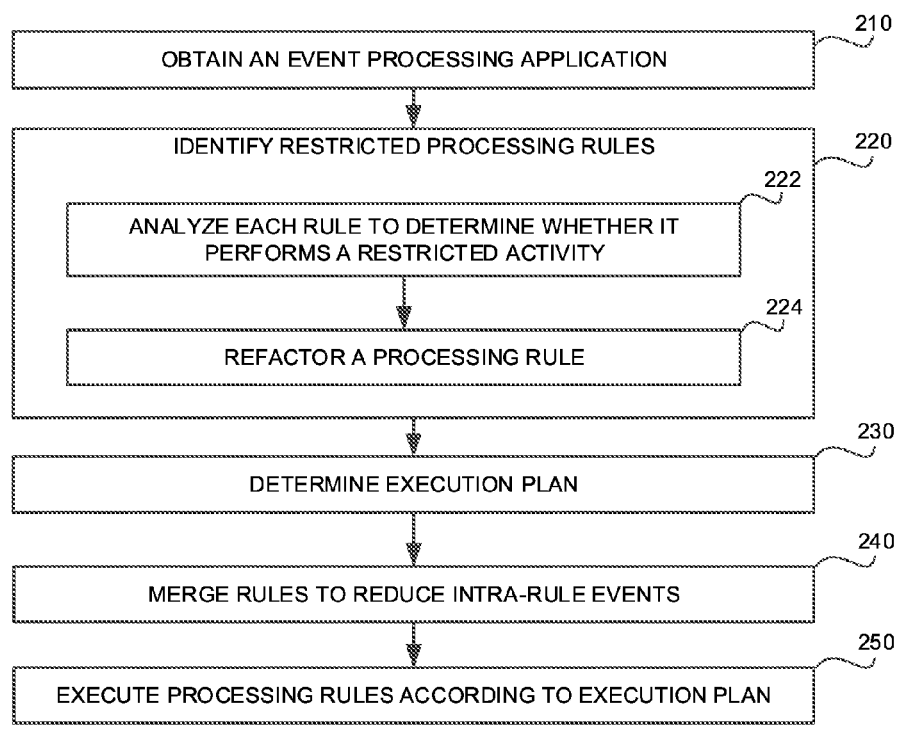
FIGS. 2A and 2B show flowchart diagrams of methods, in accordance with some exemplary embodiments of the subject matter.

Referring now to FIG. 2A showing a flowchart diagram of a method in accordance with some exemplary embodiments of the subject matter.

In Step 210, an event processing application may be obtained. The event processing process may comprise a network of a plurality of processing rules. In some exemplary embodiments, each processing rule, when executed by a computing platform, may be configured to process incoming events and output outgoing events. In some exemplary embodiments, the event processing application may be executed in a multi-platform environment. The multi-platform environment may comprise a first computing platform and a second computing platform.

In Step 220, one or more processing rules comprised by the event processing application, that are restricted to be executed in the first computing platform, may be identified.

In Step 222, each processing rule may be analyzed, to determine whether the processing rule is configured to perform a restricted activity that is restricted to be performed in a certain computing platform of the multi-platform environment. The restricted activity may be accessing confidential data that is only made available in the first computing platform, performing a computation process that is restricted based on a user indication, performing a proprietary processing that is kept as a trade secret and is only made available in the first computing platform, a retrieval or storage of a restricted data attribute, or the like.

In Step 224, a processing rule that comprises one or more restricted activities, may be refactored into a chain of processing rules. Each rule of the chain of processing rule may be either a purely restricted rule or a non-restricted rule. The purely restricted rule may be a rule consisting of at least one restricted activity. The non-restricted rule may be a rule not comprising any restricted activity.

In Step 230, an execution plan may be determined automatically. The execution plan may define for each processing rule on which platform it is executed. In some exemplary embodiments, restricted processing rules are executed according to their relevant restriction. In some exemplary embodiments, the non-restricted processing rules may be executed on one or more different platforms of the multi-platform environment. For example, one non-restricted processing rule may be executed on a public computing platform while another non-restricted processing rule may be executed on a private computing platform used for executing at least one restricted processing rule.

In Step 240, two or more sub-rules that are executed on the same computing platform consecutively may be merged together. By merging the sub-rules, a number of intra-rule events used to relay information between sub-rules, which may have been s added due to the refactoring of processing rules (Step 224), may be reduced. Reducing the number of intra-rule events may be useful to improve performance and reduce overhead. In some exemplary embodiments, in view of the merger, the execution plan may be updated.

In Step 250, the processing rules may be deployed for execution in the multi-platform environment according to the execution plan. Accordingly, the processing rules may be executed by the runtime environments.

Figure 2B:
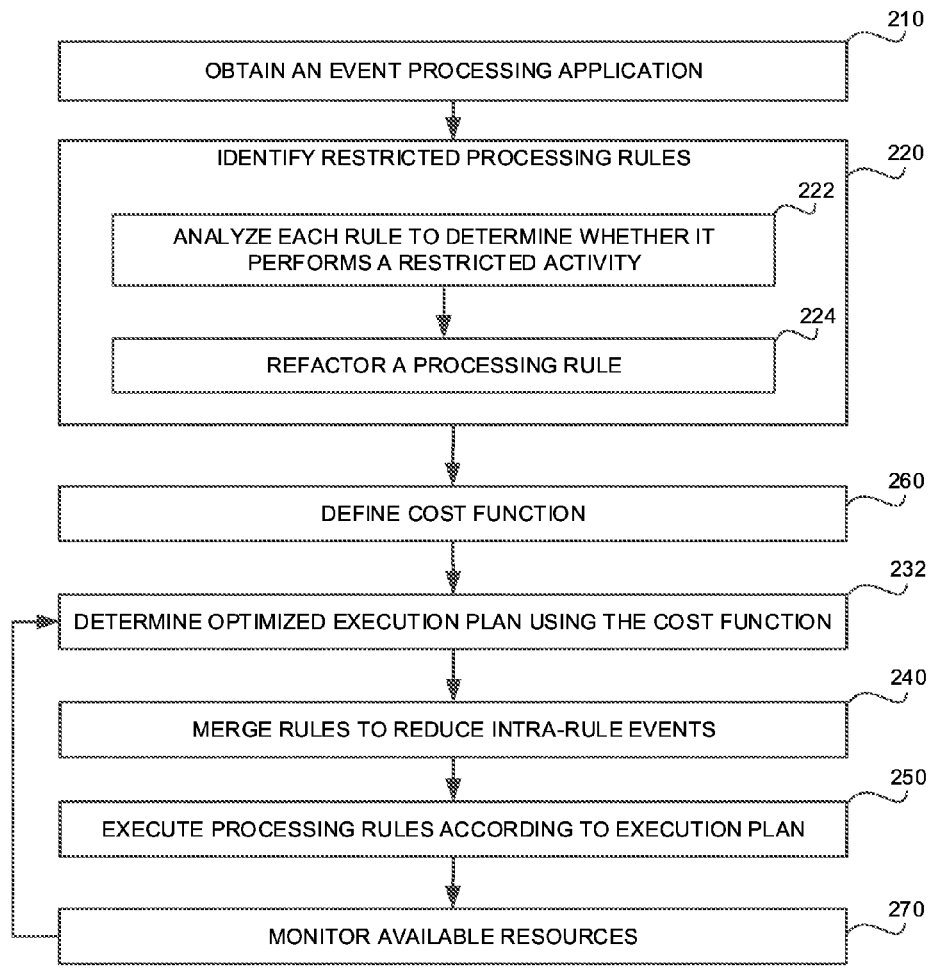

Referring now to FIG. 2B showing a flowchart diagram of a method in accordance with some exemplary embodiments of the subject matter.

In Step 260, a cost function for executing the event processing application on the multi-platform environment may be defined. In some exemplary embodiments, an execution cost of a processing rule by the second computing platform may be smaller than an execution cost of the processing rule by the first computing platform. In some exemplary embodiments, the cost function may take into account latency overhead for transferring information between different platforms of the multi-platform environment. As a result, the cost function may balance between improved processing of rules by transferring such rules to the second platform with the overhead of such transfer which may comprise communication-related overhead.

In Step 232, an optimized execution plan of the event processing application may be determined based on the cost function. In some exemplary embodiments, the optimized execution plan may be determined by minimizing the cost function.

In some exemplary embodiments, the optimized execution plan may be determined in a static manner prior to execution the plurality of processing rules. Additionally or alternatively, the optimized execution plan may be determined or updated in a dynamic manner during the execution the plurality of processing rules. The dynamic determination of the optimized execution plan may be performed based on the monitored available resources (Step 270) during execution, whereby the optimized execution plan is a dynamic execution plan.

In some exemplary embodiments, at least one non-restricted rule may be duplicated. The at least one non-restricted rule may be available for execution in both the first computing platform and in the second computing platform. The determination which replica to execute may depend on the execution plan. In some exemplary embodiments, the original execution plan may be to execute one replica, however after updating the execution plan in view of currently available resources, it may be determined to use a different replica.

Figure 3:
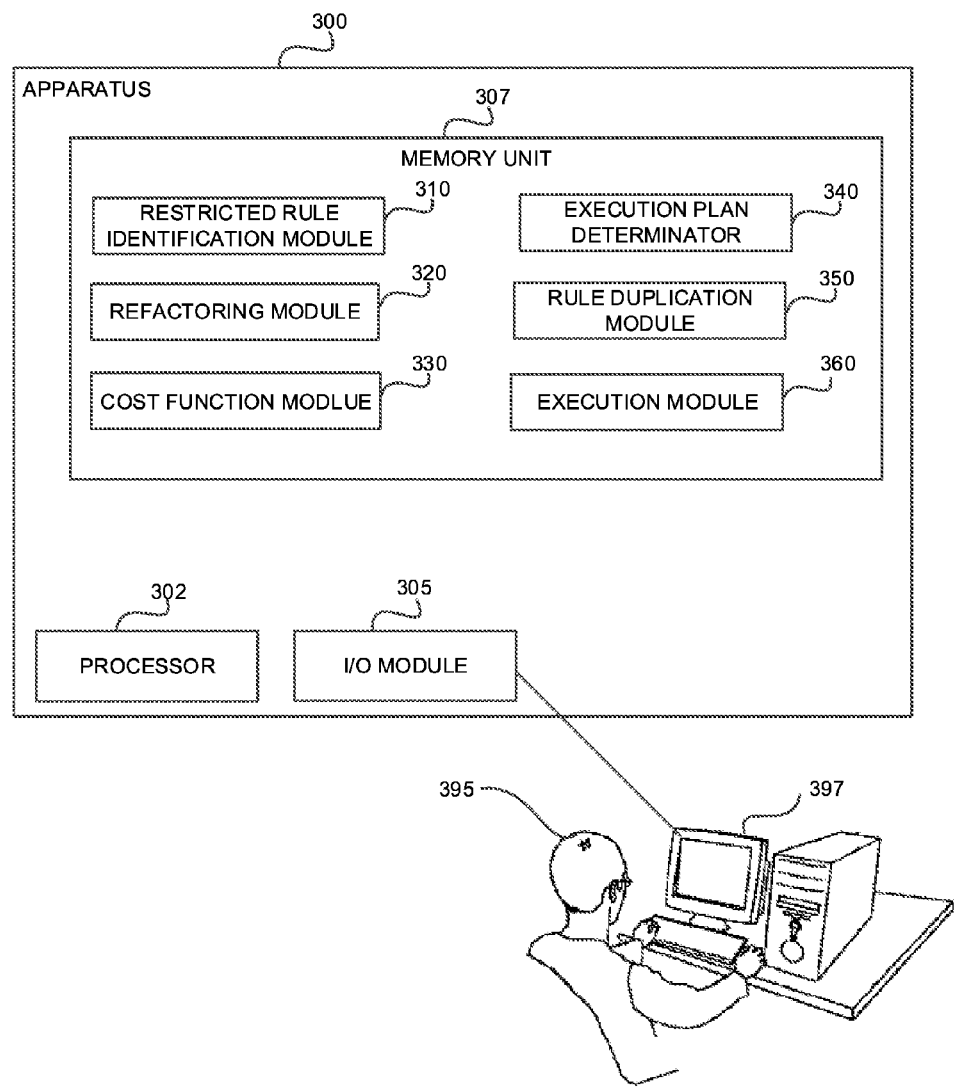
FIG. 3 shows a block diagram of an apparatus, in accordance with some exemplary embodiments of the disclosed subject matter.

Referring now to FIG. 3 showing a block diagram of an apparatus in accordance with some exemplary embodiments of the disclosed subject matter.

In some exemplary embodiments, Apparatus 300 may comprise one or more Processor(s) 302. Processor 302 may be a Central Processing Unit (CPU), a microprocessor, an electronic circuit, an Integrated Circuit (IC) or the like. Processor 302 may be utilized to perform computations required by Apparatus 300 or any of it subcomponents.

In some exemplary embodiments of the disclosed subject matter, Apparatus 300 may comprise an Input/Output (I/O) Module 305. Apparatus 300 may utilize I/O Module 305 as an interface to transmit and/or receive information and instructions between Apparatus 300 and external I/O devices, such as a Workstation 397, a Computing Device (not shown), or the like. In some exemplary embodiments, I/O module 305 may provide an interface to the multi-platform environment and may be useful for instructing a computing platform to execute a processing rule, thereby implementing an execution plan determined by Apparatus 300.

In some exemplary embodiments, I/O Module 305 may be used to provide an interface to a User 395 of the system, such as by providing output, outcome of event processing, or the like. User 395 may use Workstation 397 to input an EP application to be processed and executed on multi-platform environments. In some exemplary embodiments, User 395 may provide user input indicating which fields of records are restricted and to which platform, indicate which logical component executed by the processing rules are confidential and restricted, or the like. It will be appreciated that Apparatus 300 can operate without human operation.

In some exemplary embodiments, Apparatus 300 may comprise a Memory Unit 307. Memory Unit 307 may be a hard disk drive, a Flash disk, a Random Access Memory (RAM), a memory chip, or the like. In some exemplary embodiments, s Memory Unit 307 may retain program code operative to cause Processor 302 to perform acts associated with any of the subcomponents of Apparatus 300.

In some exemplary embodiments, Memory Unit 307 may comprise a Restricted Rule Identification Module 310. Restricted Rule Identification Module 310 may be configured to automatically identify one or more processing rules comprised by an EP application, that are restricted to be executed in a specific computing platform of a multi-platform environment. In some exemplary embodiments, the Restricted Rule Identification Module 310 may be configured to analyze rules and identify whether they are configured to perform one or more restricted activities. In some exemplary embodiments, the analysis may comprise identifying retrieved tables, entities, fields or the like from a data repository and detecting that at least a portion thereof comprises restricted data fields. Additionally or alternatively, the analysis may comprise identifying invocation of functions, logic modules, or similar constructs that are indicated as restricted.

In some exemplary embodiments, Memory Unit 307 may comprise a Refactoring Module 320. Refactoring Module 320 may be configured to refactor a processing rule that comprises one or more restricted activities, into a chain of processing rules. Refactoring Module 320 may be configured to introduce intra-rule events between the rules of the chain of processing rules. Refactoring Module 320 may be configured to refactor the processing rule into restricted rules and non-restricted rules. Some or all of the restricted rules may be purely restricted rules.

In some exemplary embodiments, Memory Unit 307 may comprise a Cost Function Module 330. Cost Function Module 330 may be configured to define a cost function for executing an EP application in a multi-platform environment. The cost function may take into account resources available to each platform for executing processing rules and latency overhead for transferring information between computing platforms as required by a specific deployment of the processing rules.

In some exemplary embodiments, Memory Unit 307 may comprise an Execution Plan Determinator 340. Execution Plan Determinator 340 may be configured to determine an optimized execution plan of an EP application by minimizing the cost function defined by Cost Function Module 330. In some exemplary embodiments, Execution Plan Determinator 340 may be configured to determine the optimized execution plan in a static manner prior to execution the processing rules. Execution Plan Determinator 340 may be configured to prescribe restricted rules to be executed in a restricted platform, and to determine regarding non-restricted rules whether to be executed in the same restricted platform, a different restricted platform or a non-restricted platform, such as a cloud-computing platform available over the Internet.

In some exemplary embodiments, Memory Unit 307 may comprise a Rule Duplication Module 350. Rule Duplication Module 350 may be configured to duplicate non-restricted rules to be available for execution in two or more computing platforms of the multi-platform environment.

In some exemplary embodiments, Memory Unit 307 may comprise an Execution Module 360. Execution Module 360 may be configured to execute EP applications in the multi-platform environment based on the optimized execution plan determined by Execution Plan Determinator 340. In some exemplary embodiments, Execution Module 360 may be configured to monitor available resources during execution of the EP application. Based on the monitored available resources, Execution Plan Determinator 340 may be invoked to re-compute, update or modify the execution plan according to currently available resources. In such a manner, a dynamic execution plan may be determined and maintained. In some exemplary embodiments, Execution Plan Determinator 340 may be invoked upon a monitored modification of the available resources that is more than a predetermined minimal threshold, such as over 10% in one platform, over 5% overall in the multi-platform environment, or the like.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access s memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram s block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method for executing an event processing application in a multi-platform environment, wherein the multi-platform environment comprising a first computing platform and a second computing platform, wherein the event processing application comprising a network of a plurality of processing rules, wherein each processing rule, when executed by a computing platform, is configured to process incoming events and output outgoing events; wherein said method comprising:
   automatically identifying one or more processing rules comprised by the event processing application that are restricted to be executed in the first computing platform, wherein said automatically identifying comprises: analyzing each rule in the plurality of processing rules to determine whether the rule is configured to perform a restricted activity,
   said automatically identifying comprises refactoring a processing rule that comprises one or more restricted activities, into a chain of processing rules, wherein the chain of processing rules comprises one or more purely restricted rules and one or more non-restricted rules, wherein a purely restricted rule is a rule consisting of at least one restricted activity, wherein a non-restricted rule is a rule not comprising any restricted activity; and
   executing the plurality of processing rules in the multi-platform environment, wherein the one or more processing rules are executed in the first computing platform, wherein the one or more processing rules that are executed in the first computing platform comprise each purely restricted rule, and at least one processing rule of the event processing application is executed in the second computing platform.

2. The method of claim 1, wherein a portion of non-restricted rules of the chain of processing rules is executed in the first computing platform, and wherein a remainder portion of the non-restricted rules is executed in the second computing platform.

3. The method of claim 1, further comprises:
   defining a cost function for executing the event processing application on the multi-platform environment, while calculating latency overhead for transferring information between different platforms of the multi-platform environment, wherein an execution cost of a processing rule by the second computing platform is smaller than an execution cost of the processing rule by the first computing platform;
   determining an optimized execution plan of the event processing application by minimizing the cost function;
   wherein said executing the plurality of processing rules comprises performing the optimized execution plan.

4. The method of claim 3, wherein said determining the optimized execution plan is performed in a static manner prior to execution the plurality of processing rules.

5. The method of claim 3 further comprises:
   monitoring available resources in each computing platform of the multi-platform environment, wherein the available resources comprise at least one of the following resources: available bandwidth and available processing power; and
   wherein said determining the optimized execution plan is performed dynamically while executing the plurality of processing rules based on the monitored available resources, whereby the optimized execution plan is a dynamic execution plan.

6. The method of claim 5, wherein at least one non-restricted rule is duplicated and is available for execution in both the first computing platform and in the second computing platform.

7. The method of claim 1, wherein the restricted activity is a retrieval or storage of a restricted data attribute, wherein a user indication defines which data attributes are restricted.

8. The method of claim 1, wherein the restricted activity comprises accessing confidential data that is only made available in the first computing platform.

9. The method of claim 1, wherein the restricted activity is performing a computation process that is restricted, wherein a user indication defines which computation processes are restricted.

10. The method of claim 1, wherein the restricted activity comprises performing a proprietary processing that is kept as a trade secret and is only made available in the first computing platform.

11. The method of claim 1, wherein the multi-platform environment comprises a third computing platform, wherein a second restricted activity is restricted to be executed only on the third computing platform.

12. A multi-platform system for executing an event processing application, wherein the multi-platform system comprising a first computing platform and a second computing platform, wherein the event processing application comprising a network of a plurality of processing rules, wherein each processing rule, when executed by a computing platform, is configured to process incoming events and output outgoing events; wherein said multi-platform system comprising one or more processors being adapted to perform:

automatically identifying one or more processing rules comprised by the event processing application that are restricted to be executed in the first computing platform, wherein said automatically identifying comprises: analyzing each rule in the plurality of processing rules to determine whether the rule is configured to perform a restricted activity, said automatically identifying comprises refactoring a processing rule that comprises one or more restricted activities, into a chain of processing rules, wherein the chain of processing rules comprises one or more purely restricted rules and one or more non-restricted rules, wherein a purely restricted rule is a rule consisting of at least one restricted activity, wherein a non-restricted rule is a rule not comprising any restricted activity; and executing the plurality of processing rules, wherein the one or more processing rules are executed in the first computing platform, wherein the one or more processing rules that are executed in the first computing platform comprise each purely restricted rule, and at least one processing rule of the event processing application is executed in the second computing platform.

13. The multi-platform system of claim 12, wherein a portion of non-restricted rules of the chain of processing rules is executed in the first computing platform, and wherein a remainder portion of the non-restricted rules is executed in the second computing platform.

14. The multi-platform system of claim 12, wherein the one or more processors are further adapted to:

define a cost function for executing the event processing application on the multi-platform system, while calculating latency overhead for transferring information between different platforms of the multi-platform system, wherein an execution cost of a processing rule by the second computing platform is smaller than an execution cost of the processing rule by the first computing platform;

determine an optimized execution plan of the event processing application by minimizing the cost function;

wherein said executing the plurality of processing rules comprises performing the optimized execution plan.

15. The multi-platform system of claim 12, wherein the restricted activity comprises accessing confidential data that is only made available in the first computing platform.

16. The multi-platform system of claim 12, wherein the restricted activity is performing a computation process that is user-indicated as restricted.

17. The multi-platform system of claim 12 comprising a third computing platform, wherein a second restricted activity is restricted to be executed only on the third computing platform.

18. A computer program product for executing an event processing application in a multi-platform environment, wherein the multi-platform environment comprising a first computing platform and a second computing platform, wherein the event processing application comprising a network of a plurality of processing rules, wherein each processing rule, when executed by a computing platform, is configured to process incoming events and output outgoing events, wherein said computer program product comprising a non-transitory computer readable storage medium retaining program instructions, which program instructions when read by a processor, cause the processor to perform a method comprising:

automatically identifying one or more processing rules comprised by the event processing application that are restricted to be executed in the first computing platform, wherein said automatically identifying comprises: analyzing each rule in the plurality of processing rules to determine whether the rule is configured to perform a restricted activity, said automatically identifying comprises refactoring a processing rule that comprises one or more restricted activities, into a chain of processing rules, wherein the chain of processing rules comprises one or more purely restricted rules and one or more non-restricted rules, wherein a purely restricted rule is a rule consisting of at least one restricted activity, wherein a non-restricted rule is a rule not comprising any restricted activity; and executing the plurality of processing rules in the multi-platform environment, wherein the one or more processing rules are executed in the first computing platform, wherein the one or more processing rules that are executed in the first computing platform comprise each purely restricted rule, and at least one processing rule of the event processing application is executed in the second computing platform.

\* \* \* \* \*